(12) United States Patent
Kuo

(10) Patent No.: US 7,054,306 B2
(45) Date of Patent: May 30, 2006

(54) METHOD FOR HANDLING CIPHERING STATUS IN A WIRELESS NETWORK

(75) Inventor: Richard Lee-Chee Kuo, Hsin-Chu (TW)

(73) Assignee: Asustek Computer Inc., Taipei (TW)

( * ) Notice: Subject to any disclaimer, the term of this patent is extended or adjusted under 35 U.S.C. 154(b) by 834 days.

(21) Appl. No.: 10/064,778

(22) Filed: Aug. 16, 2002

(65) Prior Publication Data

US 2004/0032858 A1 Feb. 19, 2004

(51) Int. Cl.
*H04L 12/28* (2006.01)
*H04L 9/00* (2006.01)

(52) U.S. Cl. .................. 370/352; 370/401; 380/255; 713/160

(58) Field of Classification Search ............... None
See application file for complete search history.

(56) References Cited

U.S. PATENT DOCUMENTS

| | | | | |
|---|---|---|---|---|
| 6,460,137 B1 * | 10/2002 | Akiyama et al. | ........... | 713/160 |
| 6,539,094 B1 * | 3/2003 | Osakabe et al. | ........... | 713/160 |
| 6,879,820 B1 * | 4/2005 | Bjelland et al. | ........... | 455/406 |
| 6,961,588 B1 * | 11/2005 | Watanabe | ................. | 455/560 |
| 6,965,995 B1 * | 11/2005 | Sato | .................. | 713/160 |

OTHER PUBLICATIONS

3GPP TS 25.331 V3.10.0 (Mar. 2002) 3rd Generation Partnership Project; Technical Specification Group Radio Access Network; Radio Resource Control (RRC); Protocol Specification (Release 1999).
3GPP TS 25.322 V3.10.0 (Mar. 2002) 3rd Generation Partnership Project; Technical Specification Group Radio Access Network; Radio Link Control (RLC) Protocol Specification (Release 1999).

* cited by examiner

*Primary Examiner*—Andrew C. Lee
(74) *Attorney, Agent, or Firm*—Winston Hsu

(57) ABSTRACT

A mobile unit maintains a first ciphering status variable for a packet switched (PS) domain and a second ciphering status variable for circuit switched (CS) domain. When a mobile unit receives a security mode command indicating that ciphering is to be activated or deactivated for transmissions in the PS domain, the first ciphering status variable is set according to the security mode command. When the UTRAN transmits a security mode command indicating that ciphering is to be activated or deactivated for transmissions in the CS domain, the second ciphering status variable is set according to the security mode command. The mobile unit ciphers or does not cipher transmissions based on the value of the ciphering status variable corresponding to the transmission domain of the radio bearer.

3 Claims, 5 Drawing Sheets

METHOD FOR HANDLING CIPHERING STATUS IN A WIRELESS NETWORK

BACKGROUND OF INVENTION

1. Field of the Invention

The present invention relates to a wireless communications system. More specifically, the present invention discloses a method correcting ciphering status maintenance in a wireless communications system.

2. Description of the Prior Art

Please refer to FIG. 1. FIG. 1 is a simple block diagram of a prior art wireless communications system 10, as defined by the 3$^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference. The wireless communications system 10 comprises a plurality of radio network subsystems (RNSs) 20 in communications with a core network (CN) 30. The plurality of RNSs 20 is termed a Universal Mobile Telecommunications System (UMTS) Terrestrial Radio Access Network, or UTRAN 20*u* for short. Each RNS 20 comprises one radio network controller (RNC) 22 that is in communications with a plurality of Node Bs 24. Each Node B 24 is a transceiver, which is adapted to send and receive wireless signals, and which defines a cell region. A plurality of Node Bs 24 defines a UTRAN Registration Area (URA). The wireless communications system 10 assigns a mobile unit 40 (generally termed a "UE" for User Equipment) to a particular RNS 20, which is then termed the serving RNS (SRNS) 20*s* of the UE 40.

Please refer to FIG. 2. FIG. 2 is a simplified block diagram of the UTRAN 20*u* in wireless communications with the UE 40 of FIG. 1. The UTRAN 20*u* communicates with the UE 40 over a plurality of radio bearers 12. The UE 40 thus has corresponding radio bearers 22, one for each of the radio bearers 12. Each radio bearer 12 has a receiving buffer 12*r* for holding protocol data units (PDUs) 11*r* received from the corresponding radio bearer 22 of the UE 40.

Each radio bearer 12 also has a transmitting buffer 12*t* for holding PDUs 11*t* that are awaiting transmission to the corresponding radio bearer 22 of the UE 40. A PDU 11*t* is transmitted by the UTRAN 20*u* along a radio bearer 12 and received by the UE 40 to generate a corresponding PDU 21*r* in a receiving buffer 22*r* of the corresponding radio bearer 22. Similarly, a PDU 21*t* is transmitted by the UE 40 along a radio bearer 22 and received by the UTRAN 20*u* to generate a corresponding PDU 11*r* in the receiving buffer 12*r* of the corresponding radio bearer 12.

For the sake of consistency, the data structures of pair entity PDUs 11*t*, 21*r*, and 21*t*, 11*r* along corresponding radio bearers 12 and 22 are identical. That is, a transmitted PDU 11*t* generates an identical corresponding received PDU 21*r*, and a transmitted PDU 21*t* generates an identical corresponding PDU 11*r*. Although the data structure of each pair entity PDU 11*t*, 21*r*, and 21*t*, 11*r* along corresponding radio bearers 12 and 22 is identical, different radio bearers 12, 22 may use different PDU data structures according to the type of connection agreed upon along the peer entity radio bearers 12, 22.

There are two distinct connection methods, or domains, within the core network 30 for carrying PDUs 11*t*, 21*t*: a circuit switched (CS) domain 30*c* and a packet switched (PS) domain 30*p*. A CS connection 30*c* provides a dedicated path to a single connection and no other stations can use that dedicated path until the call is finished. Circuit switching uses a constant bit rate (CBR) and is frequently called synchronous switching because the PDUs 11*t*, 21*t* are transmitted only in the specific dedicated path.

On the other hand, packet switching (PS) 30*p* breaks down data streams into variably sized packets (PDUs 11*t*, 21*t*) that are transmitted with a variable bit rate (VBR) in bursts over radio bearers 12, 22 that are shared with other stations on a first come, first serve basis. For this reason, packet switching is often referred to an asynchronous switching.

In general, every PDU 11*r*, 11*t*, 21*r* and 21*t* will have a sequence number 5*r*, 5*t*, 6*r*, 6*t*. The sequence number 5*r*, 5*t*, 6*r*, 6*t* is an m-bit number that is incremented for each PDU 11*r*, 11*t*, 21*r*, 21*t*. The magnitude of the sequence number 5*r*, 5*t*, 6*r*, 6*t* indicates the sequential ordering of the PDU 11*r*, 11*t*, 21*r*, 21*t* in its buffer 12*r*, 12*t*, 22*r*, 22*t*. For example, a received PDU 11*r* with a sequence number 5*r* of 108 is sequentially before a received PDU 11*r* with a sequence number 5*r* of 109, and sequentially after a PDU 11*r* with a sequence number 5*r* of 107. The sequence number 5*t*, 6*t* is often explicitly carried by the PDU 11*t*, 21*t*, but may also be implicitly assigned by the UTRAN 20*u* or UE 40. For example, in an acknowledged mode (AM) setup for corresponding radio bearers 12 and 22, each transmitted PDU 11*t* explicitly carries a 12-bit sequence number 5*t*; successful reception of each transmitted PDU 11*t* generates an identical corresponding PDU 21*r* and is acknowledged as received by the UE 40 by using the sequence number 6*r* of the received PDU 21*r*.

A 12-bit sequence number 5*t* is explicitly carried by each PDU 11*t* in acknowledged mode transmissions. The UE 40 scans the sequence numbers 6*r* embedded within the received PDUs 21*r* to determine the sequential ordering of the PDUs 21*r*, and to determine if any PDUs 21*r* are missing. The UE 40 can then send a message to the UTRAN 20*u* that indicates which PDUs 21*r* were received by using the sequence numbers 6*r* of each received PDU 21*r*, or may request that a PDU 11*t* be re-transmitted by specifying the sequence number 5*t* of the PDU 11*t* to be re-transmitted.

Alternatively, in an unacknowledged transmission mode (UM), 7-bit sequence numbers 5*t*, 6*t* are explicitly carried by the transmitted PDUs 11*t*, 21*t*, but received PDUs 11*r*, 21*r* are not acknowledged as successfully received. In certain special cases, such as a transparent transmission mode, sequence numbers are not even assigned to PDUs 11*t*, 11*r*, 21*t*, 21*r*.

The PDUs 11*t* and 21*t* are generally not transmitted "out in the open". A ciphering engine 14 on the UTRAN 20*u* and a corresponding ciphering engine 24 on the UE 40 together ensure secure and private exchanges of data exclusively between the UTRAN 20*u* and the UE 40. A function of the ciphering engine 14, 24 is the obfuscation (i.e., ciphering, or encryption) of data held within a transmitted PDU 11*t*, 21*t* so that the corresponding PDU 11*r*, 21*r* presents a meaningless collection of random numbers to an eavesdropper.

PS domain 30*p* and CS domain 30*c* connections can simultaneously co-exist between the UTRAN 20*u* and the UE 40 and one, none, or both of the PS and the CS domains 30*p*, 30*c* can make use of ciphering. Therefore, when transmitting a PDU 11*t*, the ciphering engine 14 uses, amongst other inputs, a ciphering key 14*p* (for PS domain 30*p* connections) and a ciphering key 14*c* (for CS domain 30*c* connections) to perform ciphering functions upon a PDU 11*t*.

To properly decipher a corresponding PDU 21*r*, the corresponding ciphering engine 24 must use an identical ciphering key 24*p* or 24*c* depending on the specific domain 30p, 30c currently in use. The ciphering keys 14p, 24p, and 14c, 24c are different for the respective domains but remain constant across all PDUs 11t, 21t within a specific domain (and thus corresponding PDUs 21r, 11r) and radio bearers 12, 22, until explicitly changed by both the UTRAN 20u and the UE 40.

Changing of the ciphering keys 14p, 24p and 14c, 24c is effected by a security mode reconfiguration process that involves handshaking between the UTRAN 20u and the UE 40 to ensure proper synchronization of the ciphering engines 14, 24. The UTRAN 20u typically initiates the security mode reconfiguration process. Security mode reconfiguration is used to change the ciphering keys 14p, 24p and 14c, 24c and to both activate and deactivate ciphering of transmitted PDUs 11t, 21t.

Security mode reconfiguration is a somewhat complicated process that involves several steps. One of the initial steps is the transmitting by the UTRAN 20u of a ciphering reconfiguration message, a so-called security mode command, along a special signaling radio bearer 12s to the UE 40. The security mode command indicates the new ciphering configuration that is to be used by the UTRAN 20u and the UE 40, such as the use of the new ciphering key 14n, 24n, or the activation or deactivation of PDU 11t, 21t ciphering.

Note that the security mode command is itself carried by one or more PDUs 11t, and thus may be enciphered under the old ciphering configuration, i.e., using the ciphering key 14p or 14c depending on the domain for which the most recent security negotiation took place. The radio bearer 12s is an acknowledged mode radio bearer, and thus the UE 40 will explicitly acknowledge using the radio bearer 22s the successful reception of each PDU 11t that carries the security mode command as shown in FIG. 3. In this manner, the UTRAN 20u can be certain that the security mode command was received and processed by the UE 40.

An Information Element (IE) has an enumerated variable maintaining a ciphering status 25 in the UE 40 holding information about the current status of ciphering in the UE 40, and can be set to either "Not started" or "Started". The UTRAN 20u comprises a corresponding variable 15 to maintain the ciphering status information in the UTRAN 20u. When a security mode command is received by the UE 40 indicating the activation of PDU 11t, 21t ciphering, the ciphering status variable 25 in the UE 40 is set to "Started". When a security mode command is received by the UE 40 indicating the deactivation of PDU 11t, 21t ciphering, the ciphering status variable 25 in the UE 40 is set to "Not started". When transmitting PDUs 21t or receiving PDUs 21r, the UE 40 checks the value of the variable ciphering status 25 to determine if ciphering is to be used to encrypt/decrypt the PDUs 21t, 21r. If the value of the ciphering status variable 25 is set to "Not started", ciphering is not used. If the value of the ciphering status variable 25 is set to "Started", the ciphering engine 24 and the ciphering key 24c or 24p is be used, depending upon the domain 30p, 30c of the associated radio bearer 22.

A problem in the prior art occurs when the UTRAN 20u and the UE 40 are using both the PS domain and the CS domain for wireless communications. Although the ciphering keys 14p, 24p and 14c, 24c are domain specific, the ciphering status variable 25 is not domain specific because there is only one ciphering status variable 25 in the UE 40.

For example, consider the following scenario:

1) A PS connection is established and a security mode command is sent from the UTRAN 20u to the UE 40 initiating a security mode control procedure to start ciphering for the PS domain. The ciphering status variable 25 is set to "Started" and ciphering is started for the PS connection.

2) A CS connection is subsequently established between the UTRAN 20u and the UE 40, and the UTRAN 20u does not send a security mode command to the UE 40 specifying that ciphering is to be used in the CS connection. Therefore, the UTRAN 20u is sending and expects to receive un-ciphered PDUs 11r, 11t when using the CS mode connection. However, when the UE 40 transmits or receives the respective PDUs 21t or 21r, the UE 40 checks the value of the ciphering status variable 25 to determine if ciphering is to be used with the PDUs 21t, 21r. Consequently, the UE 40 begins ciphering of the CS PDUs 21t, 21r because the ciphering status variable 25 was previously set to a value of "Started" by the security mode command intended only for the PS connection. Obviously, using the ciphering engine 14 in this situation has undesirable consequences and results in the PDUs 21t, 21r being converted into a meaningless collection of random numbers.

SUMMARY OF INVENTION

It is therefore an objective of the claimed invention to correct the handling of ciphering status in a wireless communications system to prevent inadvertent ciphering when establishing a new domain connection.

Briefly summarized, the preferred embodiment of the claimed invention includes a wireless communications system having a Universal Mobile Telecommunications System (UMTS) Terrestrial Radio Access Network (UTRAN), commonly referred to as a base station, in wireless communications with a mobile unit, commonly referred to as user equipment (UE).

The UTRAN can transmit protocol data units (PDUs) to the mobile unit and receive PDUs from the UE using a packet switched (PS) domain connection or a circuit switched (CS) domain connection. Both the PS and CS domain PDUs can be transmitted in a ciphered or an un-ciphered configuration, respectively. The UE includes a first ciphering status variable indicating the ciphering status, meaning the activation or deactivation of ciphering, of the PS domain PDUs, and a second ciphering status variable indicating the ciphering status of the CS domain PDUs.

When the UTRAN transmits a security mode command indicating that ciphering is to be activated or deactivated for the PDUs in the PS domain, the first ciphering status variable is set according to the security mode command. When the UTRAN transmits a security mode command indicating that ciphering is to be activated or deactivated for the PDUs in the CS domain, the second ciphering status variable is set according to the security mode command.

When the UE receives a PS domain PDU from the UTRAN, the UE determines whether the received PDU is to be decoded based on the value of the first ciphering status variable. When the UE transmits a PS domain PDU to the UTRAN, the UE determines whether the PDU awaiting transmission is to be encoded before transmission based on the value of the first ciphering status variable.

When the UE receives a CS domain PDU from the UTRAN, the UE determines whether the received PDU is to be decoded based on the value of the second ciphering status variable. When the UE transmits a CS domain PDU to the UTRAN, the UE determines whether the PDU awaiting transmission is to be encoded before transmission based on the value of the second ciphering status variable.

A second embodiment of the claimed invention is similar to the first embodiment with the addition of setting the first ciphering status variable to indicate the deactivation of ciphering when a PS connection is first being established and setting the second ciphering status variable to indicate the deactivation of ciphering when a CS connection is first being established. Deactivating ciphering for a given domain when that given domain is being established ensures that ciphering will not be performed on the PDUs within that domain unless a security mode command specifically activating ciphering within that domain is received by the UE from the UTRAN.

It is an advantage of the claimed invention to maintain one ciphering status variable for the PS domain and a separate ciphering status variable for the CS domain so that inadvertent ciphering of PDUs is avoided.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
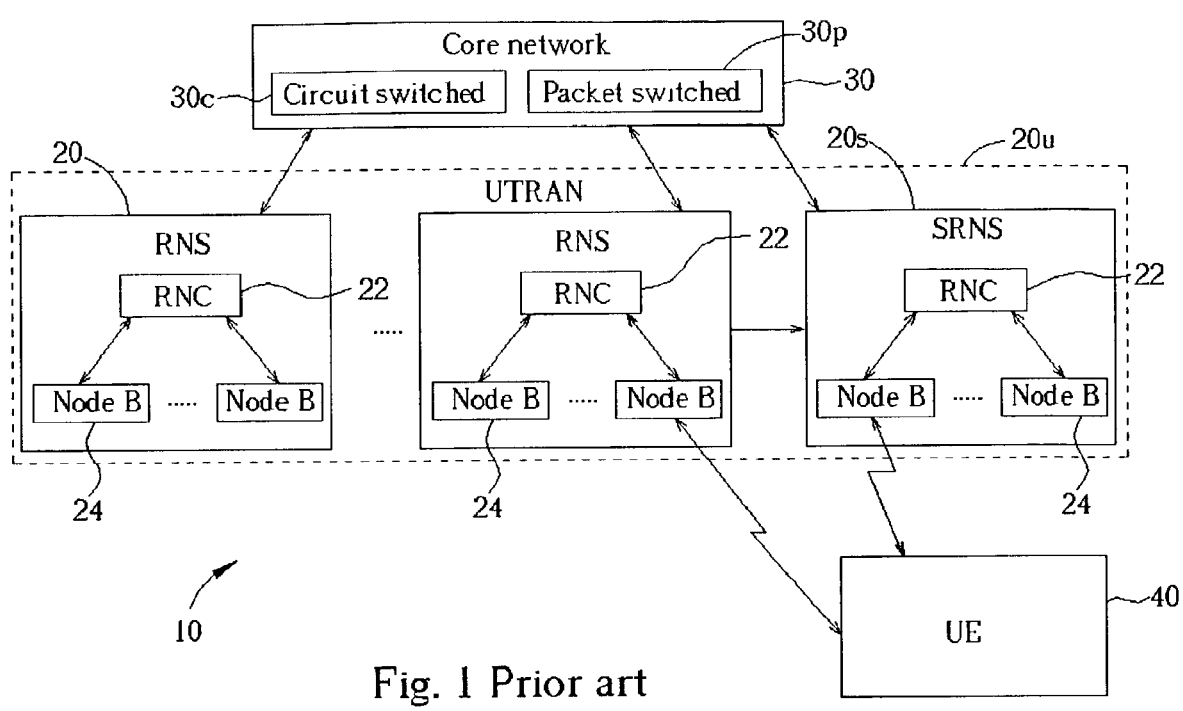
FIG. 1 is a simplified block diagram of a prior art wireless communications system.
Figure 2:
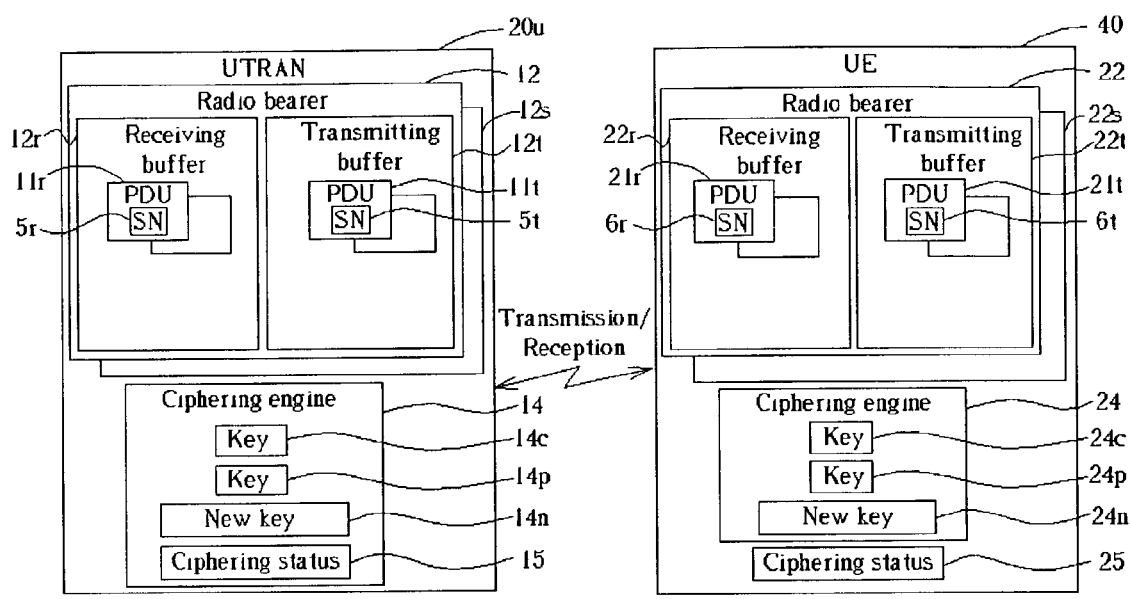
FIG. 2 is another simplified block diagram of the wireless communications system of FIG. 1.
Figure 3:
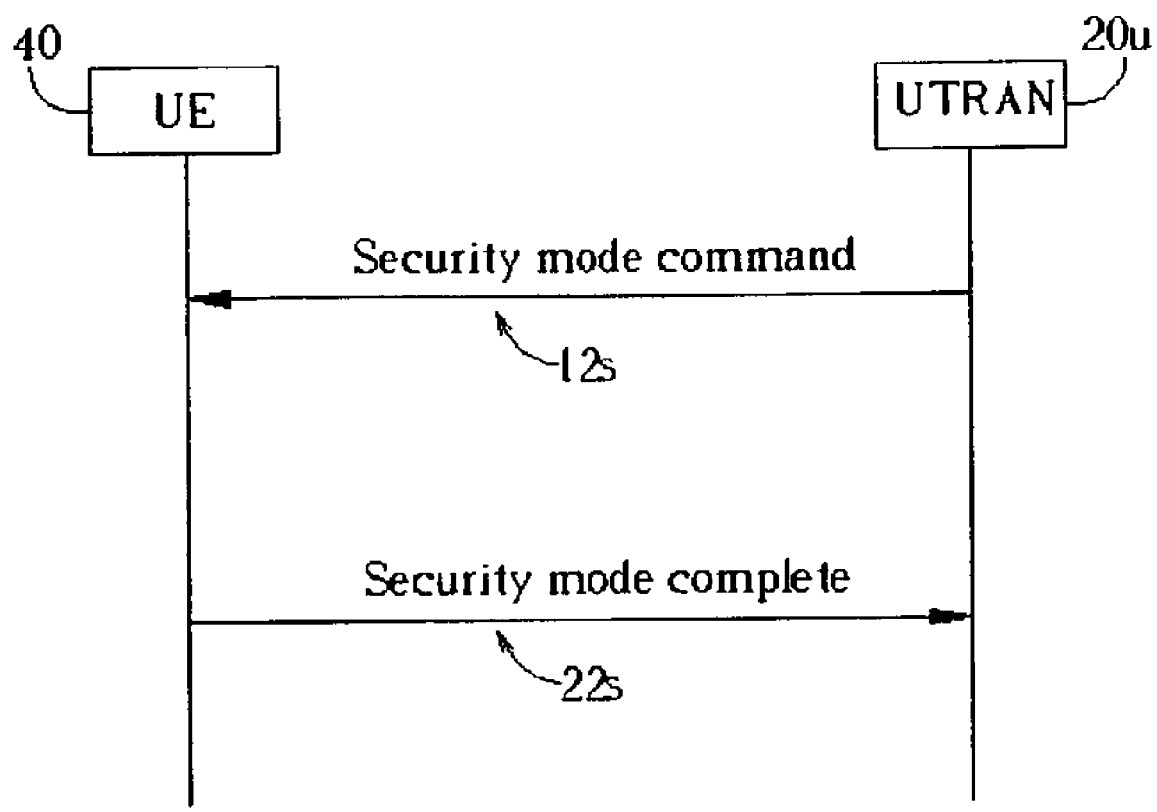
FIG. 3 is a message sequence chart for a security mode command in the wireless communications system of FIG. 1.
Figure 4:
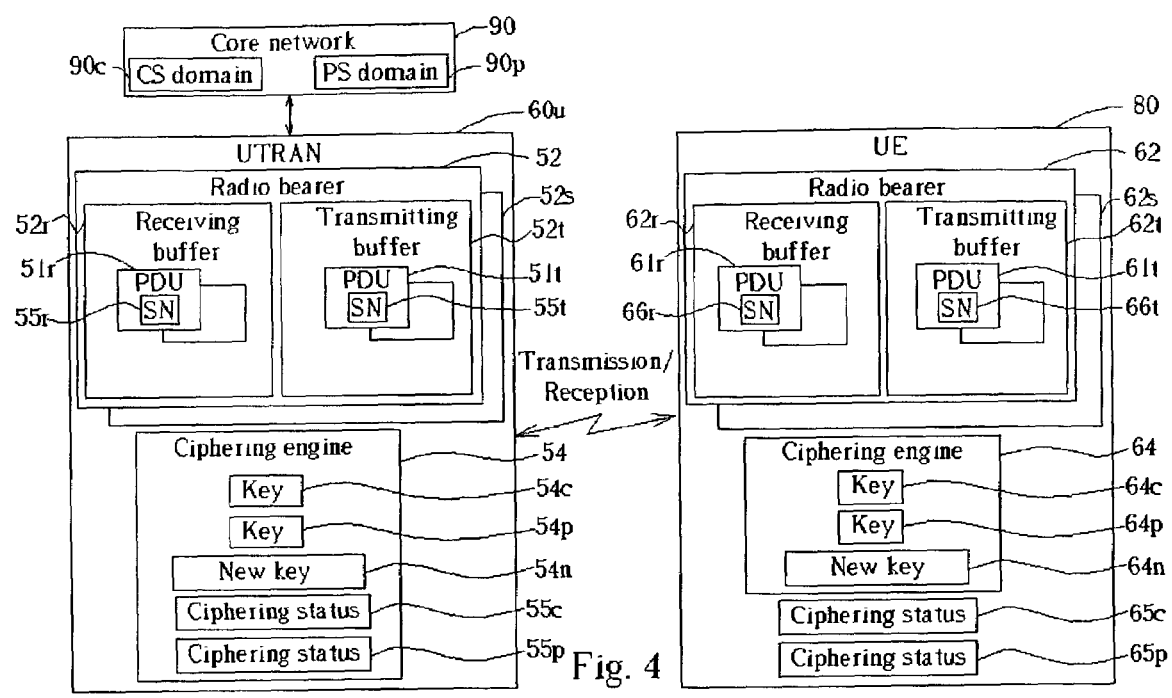
FIG. 4 is a simplified block diagram of a wireless communications system according to the present invention.

FIG. 4 is a simplified block diagram of a wireless communications system according to the present invention. The embodiment of a wireless communications system has a Universal Mobile Telecommunications System (UMTS) Terrestrial Radio Access Network (UTRAN) 60$u$, commonly referred to as a base station 60$u$, in wireless communications with a mobile unit 80, commonly referred to as user equipment (UE) 80. The UTRAN 60$u$ provides the UE 80 with access to a core network 90.

The UTRAN 60$u$ communicates with the UE 80 using a plurality of radio bearers 52, and the UE 80 communicates with the UTRAN 60$u$ using a plurality of radio bearers 62, each radio bearer 52 corresponding to a radio bearer 62. Each radio bearer 52,62 has a receiving buffer 52$r$, 62$r$ for receiving the protocol data units (PDU) 51$r$, 61$r$, and a transmitting buffer 52$t$, 62$t$ for holding the PDUs 51$t$, 61$t$ awaiting transmission.

Communications between the UTRAN 60$u$ and the UE 80 use a packet switched (PS) domain 90$p$ transmission mode and/or a circuit switched (CS) domain 90$c$ transmission mode. Additionally, the UTRAN 60$u$ and the UE 80 have ciphering engines 54 and 64 respectively to encrypt or decrypt the PDUs 51$r$, 51$t$, 61$r$, 61$t$ using a key 54$c$, 64$c$ for CS PDUs 51$r$, 51$t$, 61$r$, 61$t$, and a key 54$p$, 64$p$ for PS PDUs 51$r$, 51$t$, 61$r$, 61$t$. The ciphering of the PS and CS PDUs 51$r$, 51$t$, 61$r$, 61$t$ is optional and is domain dependent so that all the PDUs 51$r$, 51$t$, 61$r$, 61$t$ within a given domain are ciphered or all the PDUs 51$r$, 51$t$, 61$r$, 61$t$ within a given domain are not ciphered. That is, peer entity radio bearers 52, 62 are both associated with one of the domains 90$c$, 90$p$ within the core network 90, i.e., with the CS domain 90$c$ or the CS domain 90$c$, and perform ciphering accordingly.

The UE 80 includes a first ciphering status variable 65$p$ indicating the ciphering status of the PS domain 90$p$ PDUs 61$r$, 61$t$, and a second ciphering status variable 65$c$ indicating the ciphering status of the CS domain 90$c$ PDUs 61$r$, 61$t$. The ciphering status variable 65$p$ indicates whether ciphering is activated or deactivated for the PS domain 90$p$, and the ciphering status variable 65$c$ indicates whether ciphering is activated or deactivated for the CS domain 90$c$.

When the UE 80 receives a security mode command from the UTRAN 60$u$ indicating that ciphering is to be activated or deactivated for the PDUs 61$r$, 61$t$ in the PS domain 90$p$, the first ciphering status variable 65$p$ is set to a value of "Not started" or "Started", according to the PS domain security mode command. When the UE 80 receives a security mode command from the UTRAN 60$u$ indicating that ciphering is to be activated or deactivated for the PDUs 61$r$, 61$t$ in the CS domain 90$c$, the second ciphering status variable 65$c$ is set according to the CS domain security mode command.

When the UE 80 receives a PS domain PDU 61$r$ from the UTRAN 60$u$, the UE 80 determines whether the received PDU 61$r$ is to be decrypted based on the value of the first ciphering status variable 65$p$. When the UE 80 transmits a PS domain PDU 61$t$ to the UTRAN 60$u$, the UE 80 determines whether the PDU 61$t$ awaiting transmission is to be encrypted before transmission based on the value of the first ciphering status variable 65$p$.

Similarly, when the UE 80 receives a CS domain PDU 61$r$ from the UTRAN 60$u$, the UE 80 determines whether the received PDU 61$r$ is to be decrypted based on the value of the second ciphering status variable 65$c$. When the UE 80 transmits a CS domain PDU 61$t$ to the UTRAN 60$u$, the UE 80 determines whether the PDU 61$t$ awaiting transmission is to be encrypted before transmission based on the value of the second ciphering status variable 65$c$.

A second embodiment of the claimed invention is similar to the first embodiment with the addition of the UE 80 ensuring that ciphering is deactivated for a given domain 90$c$, 90$p$ before establishing an initial connection using that domain 90$c$, 90$p$. The UE 80 sets the first ciphering status variable 65$p$ to indicate the deactivation of ciphering when a PS connection is being established and no other PS connections exist. It is possible to have two or more same-domain 90$c$, 90$p$ simultaneous connections and the UE 80 has already received a security mode command activating ciphering for that domain 90$c$, 90$p$. Therefore, the second embodiment UE 80 deactivates ciphering for the PS domain 90$p$ when a PS domain connection is being established only if no other PS connections exist at the time. Similarly, the UE 80 deactivates ciphering via the second ciphering status variable 65$c$ when a CS connection is being established and no other CS connections exist. Deactivating ciphering for a given domain 90$c$, 90$p$ when that given domain 90$p$, 90$c$ is newly established ensures that ciphering will not be performed on the PDUs 61$r$, 61$t$ within that domain 90$p$, 90$c$ unless a security mode command specifically activating ciphering transmissions for that domain 90$p$, 90$c$ is received by the UE 80 from the UTRAN 60$u$.

With regard to the above embodiments for the UE 80, it should be understood that corresponding embodiments must be implemented for the UTRAN 60$u$ to ensure proper ciphering synchronization between the UE 80 and the UTRAN 60$u$. That is, the UTRAN 60$u$ should also maintain ciphering status variables (55$c$, 55$p$ of FIG. 4) that are synchronized with those of the UE 80 (65$c$, 65$p$). Such synchronization is assured by simply having the UTRAN 60u follow the method disclosed for the UE 80, and should be clear to one reasonably skilled in the art.

Figure 5:
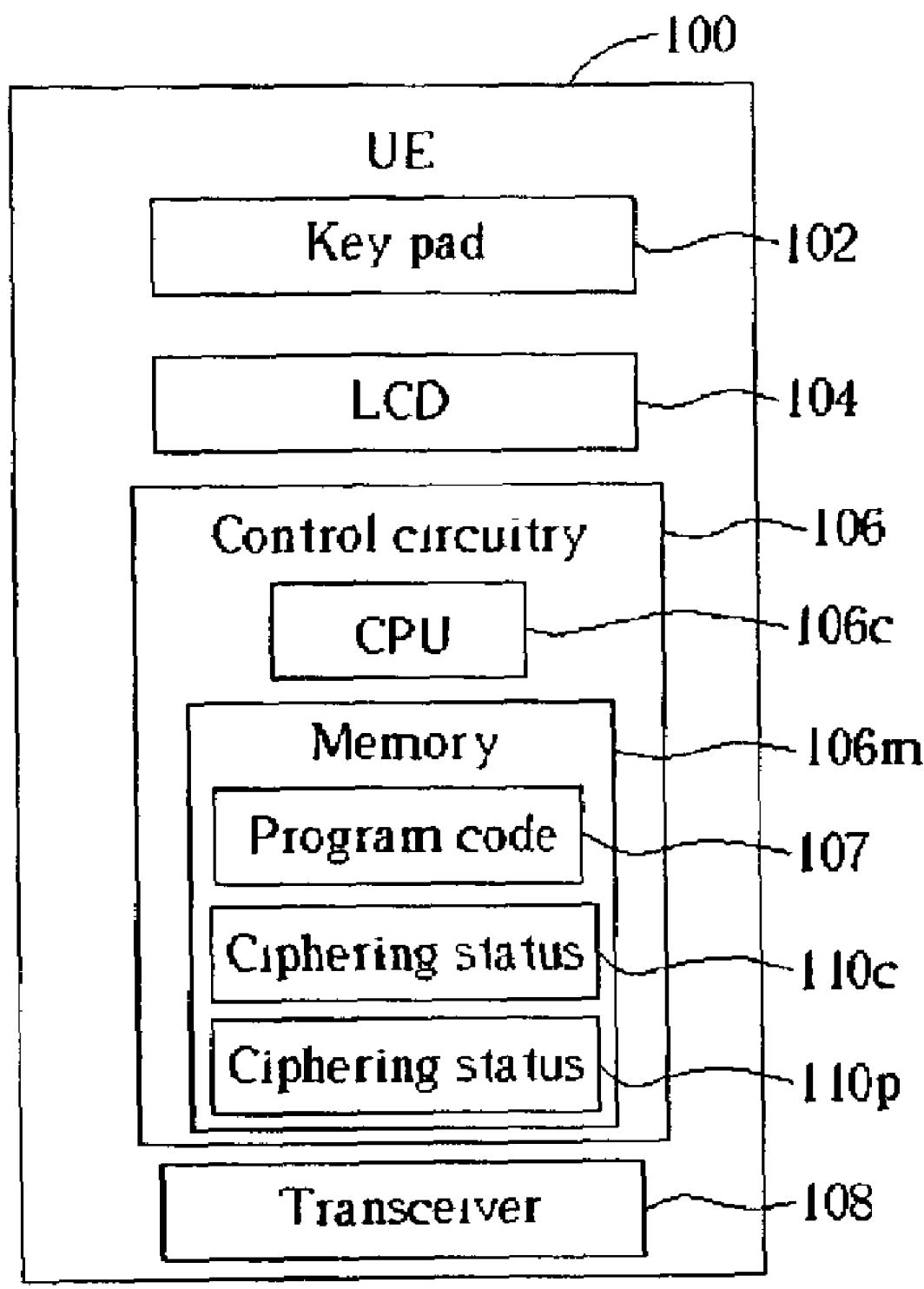
FIG. 5 is a simplified block diagram of a mobile unit in a wireless communications system according to the present invention.

FIG. 5 is a simplified block diagram of an example UE 100 according to the present invention. The UE 100 comprises a keypad 102 for data entry, an LCD 104 for displaying data, a transceiver 108 for communicating with a wireless communications system, and control circuitry 106. The control circuitry 106 comprises a CPU 106c to process controlling instructions and a memory 106m for storing data and protocol information. The memory 106m comprises a program code segment 107 and a location for storing a first ciphering status variable 110C and a second ciphering status variable 110p. The functions of the first ciphering status variable 110C and a second ciphering status variable 110p in the UE 100 are the same as the functions of first ciphering status variable 65p and the second ciphering status variable 65c in the UE 80.

In contrast to the prior art, the present invention maintains one ciphering status variable 65p for the PS domain 90p, and a separate ciphering status variable 65c for the CS domain 90c. The maintenance of separate and domain specific ciphering status variables 65p, 65c allows independent control of ciphering for each domain 90p, 90c. Independent control precludes inadvertent ciphering of the PDUs 51r, 51t, 61r, 61t within a newly established wireless communication connection.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for performing ciphering in a wireless communications system, the wireless communications system comprising a base station in wireless communications with a mobile unit, the base station capable of transmitting protocol data units (PDUs) to the mobile unit and receiving PDUs from the mobile unit using a packet switched (PS) domain or a circuit switched (CS) domain, the method comprising:

providing the mobile unit with a first ciphering status variable for the PS domain, and a second ciphering status variable for the CS domain;

the base station transmitting a security mode command to the mobile unit indicating an activation or deactivation of ciphering of the PDUs in the PS domain, or indicating an activation or deactivation of ciphering of the PDUs in the CS domain; and the mobile unit setting the first ciphering status variable according to the security mode command if the security mode command indicates an activation or deactivation of ciphering of the PDUs in the PS domain, and setting the second ciphering status variable according to the security mode command if the security mode command indicates an activation or deactivation of ciphering of the PDUs in the CS domain;

wherein after setting the first ciphering status variable or setting the second ciphering status variable, the mobile unit activates or deactivates ciphering of PDUs transmitted in the PS domain according to the first ciphering status variable and activates or deactivates the ciphering of PDUs transmitted in the CS domain according to the second ciphering status variable.

2. A method for handling ciphering in a wireless communications system, the wireless communications system comprising a base station in wireless communications with a mobile unit and capable of establishing a packet switched (PS) domain connection between the base station and the mobile unit and capable of establishing a circuit switched (CS) domain connection between the base station and the mobile unit, the method comprising:

providing the mobile unit with a first ciphering status variable for the PS domain, and a second ciphering status variable for the CS domain;

the mobile unit setting the first ciphering status variable to indicate ciphering is deactivated for the PS domain if establishing a PS connection with the base station when no other PS connections exist; and the mobile unit setting the second ciphering status variable to indicate ciphering is deactivated for the CS domain if establishing a CS connection with the base station when no other CS connections exist;

wherein after setting the first ciphering status variable or setting the second ciphering status variable, the mobile unit activates or deactivates ciphering of PDUs transmitted in the PS domain according to the first ciphering status variable, and activates or deactivates the ciphering of PDUs transmitted in the CS domain according to the second ciphering status variable.

3. A mobile unit for a wireless communications system, the wireless communications system comprising a base station in wireless communications with the mobile unit and capable of establishing a packet switched (PS) domain connection between the base station and the mobile unit and capable of establishing a circuit switched (CS) domain connection between the base station and the mobile unit, the mobile unit comprising:

a memory for storing ciphering information, the memory comprising a first ciphering status variable for indicating whether or not ciphering is to be used for data transmitted over an established PS domain connection, and a second ciphering status variable for indicating whether or not ciphering is to be used for data transmitted over an established CS domain connection; and a processing circuit electrically connected to the memory for performing ciphering such that if the first ciphering variable is set to a first predefined value, data transmitted over an established PS domain connection is not ciphered, if the first ciphering variable is set to a second predefined value, data transmitted over an established PS domain connection is ciphered, if the second ciphering variable is set to the first predefined value, data transmitted over an established CS domain connection is not ciphered, and if the second ciphering variable is set to the second predefined value, data transmitted over an established CS domain connection is ciphered.

* * * * *